US012528687B2

(12) United States Patent
Widmann

(10) Patent No.: US 12,528,687 B2
(45) Date of Patent: Jan. 20, 2026

(54) BEVERAGE DRINKING APPARATUS

(71) Applicant: Wild Man Lab LLC, Philadelphia, PA (US)

(72) Inventor: Nicholas Widmann, Philadelphia, PA (US)

(73) Assignee: Wild Man Lab LLC, Philadelphia, PA (US)

( * ) Notice: Subject to any disclaimer, the term of this patent is extended or adjusted under 35 U.S.C. 154(b) by 7 days.

(21) Appl. No.: 18/640,543

(22) Filed: Apr. 19, 2024

(65) Prior Publication Data

US 2024/0262670 A1 Aug. 8, 2024

Related U.S. Application Data

(63) Continuation of application No. 18/216,287, filed on Jun. 29, 2023, now Pat. No. 11,993,500, which is a continuation of application No. 17/971,012, filed on Oct. 21, 2022, now Pat. No. 11,731,868, which is a continuation of application No. 17/744,226, filed on May 13, 2022, now Pat. No. 11,518,663.

(60) Provisional application No. 63/188,530, filed on May 14, 2021.

(51) Int. Cl.
*B67B 7/86* (2006.01)

(52) U.S. Cl.
CPC .................................... *B67B 7/28* (2013.01)

(58) Field of Classification Search
CPC .................................. B67B 7/28; B67B 7/26
See application file for complete search history.

(56) References Cited

U.S. PATENT DOCUMENTS

| | | | | |
|---|---|---|---|---|
| 629,571 A * | 7/1899 | Lambert | B65D 47/20 222/554 |
| 1,264,960 A | 5/1918 | Moss | |
| 1,465,793 A | 8/1923 | Schilling | |
| 1,485,579 A * | 3/1924 | Wyatt | B67B 7/26 222/542 |
| 1,492,501 A * | 4/1924 | Whitesides | B67B 7/26 222/90 |
| 1,911,076 A | 5/1933 | Gandola | |

(Continued)

FOREIGN PATENT DOCUMENTS

GB 2367813 A 4/2002

OTHER PUBLICATIONS

"Chug N Plug Portable Shotgun Tool Keychain", Amazon.com; url: https://www.amazon.com/Chug-Plug-Keychain-Revolutionary-Shotgunning/dp/B07XKD8LR2; retrieved May 2022, May 2022, 8 pages.

(Continued)

*Primary Examiner* — Donnell A Long
(74) *Attorney, Agent, or Firm* — Flaster Greenberg P.C.

(57) ABSTRACT

The beverage drinking apparatus may include a spout, a pivot arm, and an entry portion. The spout may include a bore. The pivot arm may include a curved portion that defines a fulcrum for rotating the beverage drinking apparatus. The entry portion may include a flow portion defining a plurality of apertures. The entry portion may include a piercing portion that is distal from the first end of the spout. The piercing portion and the flow portion may be configured to pierce and penetrate a hole in a sidewall of the beverage can as the beverage drinking apparatus is pivoted about the fulcrum with the curved portion engaged with a bottom surface of the beverage can such that liquid flows from the beverage can into the bore through the plurality of first apertures.

21 Claims, 14 Drawing Sheets

(56) References Cited

U.S. PATENT DOCUMENTS

| | | | | | |
|---|---|---|---|---|---|
| 1,927,258 | A | | 9/1933 | Oel | |
| 2,551,099 | A | * | 5/1951 | Cosdon | B67B 7/26 172/549 |
| 2,873,885 | A | * | 2/1959 | Heller | B67B 7/26 222/548 |
| 3,599,836 | A | | 8/1971 | Hegi | |
| 3,602,396 | A | * | 8/1971 | Oates | B67B 7/26 222/88 |
| 5,630,529 | A | | 5/1997 | Chlupp | |
| 8,387,264 | B1 | | 3/2013 | Pritchard | |
| 10,280,058 | B1 | | 5/2019 | Pickett et al. | |
| 2005/0011909 | A1 | | 1/2005 | Hanell | |
| 2005/0076742 | A1 | | 4/2005 | Yurek et al. | |
| 2009/0230141 | A1 | | 9/2009 | Haney | |
| 2014/0250700 | A1 | | 9/2014 | Liotta et al. | |
| 2015/0101200 | A1 | | 4/2015 | Arellano et al. | |
| 2019/0218087 | A1 | | 7/2019 | Clark | |
| 2021/0039936 | A1 | | 2/2021 | Clifton | |

OTHER PUBLICATIONS

"Gadsden Flag Party Starter Shotgun Can Coolie (1)", Amazon.com; url: https://www.amazon.com/Flowzer-Dont-Tread-Shotgun-Coolie/dp/B01CXCASUY/ref=sr_1_2?crid=1WPESAB9S3W6X&keywords=gadsden+flag+party+shotgun+can+coolie&qid=1652462436&s=home-garden&sprefix=gadson+flag+party+%2Cgarden%2C41&sr=1-2, May 2022, 6 pages.

"Shot Gun Can Beer Bong", Amazon.com; url: https://www.amazon.com/Shot-Gun-Can-Beer-Bong/dp/B00GTWL1K6/ref=sr_1_4?crid=2SD1H20J7KV2D&keywords=Can+shotgun+beer+bong&qid=1652463565&sprefix=can+shotgun +beer+bong%2Caps%2C143&sr=8-4; retrieved May 2022, May 2022, 6 pages.

"Shotgun Tool Bottle Opener Keychain—5 pack—beer bong shotgunning tool—great for parties, party favors, gift, drinking accessories", Amazon.com; url: https://www.amazon.com/Shotgun-tool-bottle-opener-keychain/dp/B07ZFBY522?th=1; retrieved May 2022, May 2022, 9 pages.

"The Pump Action 2.0", Drunk Engineers; url: https://drunkengineers.ca/products/the-pump-action#:~:text=The%20Pump%20Action%20Shotgun%20Tool,that%20will%20re%2Dengineer%20drinking; retrieved May 2022, May 2022, 7 Pages.

"The Shotgun Shell", USA Drinking Team.com; url: https://officialusadrinkingteam.com/products/the-shotgun-shell?_pos=2&_sid=ccef0dd4c&_ss=r; retrieved May 2022, May 2022, 4 pages.

Notaro, S. , "ShotgunR is a New Way to Shotgun Beer—Kickstarter Launching November 1", PRWeb ebooks; url: https://www.prweb.com/releases/shotgunr/shotgun-beer/prweb12259434.htm, Oct. 22, 2014, 2 pages.

* cited by examiner

BEVERAGE DRINKING APPARATUS

CROSS-REFERENCE TO RELATED APPLICATIONS

This application is a continuation of U.S. patent application Ser. No. 18/216,287, filed Jun. 29, 2023, which is a continuation of non-provisional U.S. patent application Ser. No. 17/971,012, filed Oct. 21, 2022, which is a continuation of non-provisional U.S. patent application Ser. No. 17/744,226, filed May 13, 2022, which claims the benefit of provisional U.S. patent application No. 63/188,530, filed May 14, 2021, the disclosures of which are incorporated herein by reference in their entirety.

BACKGROUND

A device may be used to puncture a sidewall of a beverage or drink can, for example, an aluminum can. Commonly, a key may be used to puncture the sidewall of the beverage can. A user may desire to puncture a hole in a sidewall of a beverage can to allow consumption of the liquid within the can through the hole, which, when a pop tab is also opened, is a process widely known as "shotgunning." Shotgunning is a well-known method of consuming a beverage from beverage cans, particularly beer. Creating a hole in the sidewall through which to drink, in conjunction with the pop tab opening, allows air to enter the beverage can through the pop tab opening while liquid egresses the hole in the sidewall. As such, shotgunning a beverage allows a user to consume the beverage more rapidly from the beverage can than consumption through the pop tab opening alone.

SUMMARY

A beverage drinking apparatus may be used to dispense liquid from a beverage can. The beverage drinking apparatus may be capable of attaching (e.g., latching, hooking, or interfacing with) a pivot arm to a bottom surface of the beverage can. The beverage drinking apparatus may be capable of rotating relative to the beverage can, using the attachment of the pivot arm as a fulcrum. The beverage drinking apparatus may rotate an entry portion, comprising a plurality of apertures, into the beverage can, piercing the sidewall of the beverage can. The beverage drinking apparatus may allow liquid within the beverage can (e.g., beer) to flow through the beverage drinking apparatus and out a spout to be consumed by a user. For example, a user may open a second hole (e.g., in addition to the hole pierced in the sidewall) using a pop tab of the beverage can to permit air to enter the beverage can while the liquid flows through the beverage drinking apparatus to be consumed by the user.

The beverage drinking apparatus may include a spout, a pivot arm, and an entry portion. The spout may include a bore. The pivot arm may extend from the spout. The pivot arm may include a curved portion that defines a fulcrum for rotating the beverage drinking apparatus. The entry portion may extend from a first end of the spout. The entry portion may include a flow portion defining a plurality of apertures. The entry portion may include a piercing portion that is distal from the first end of the spout. The piercing portion may be configured to pierce a hole in a sidewall of the beverage can as the beverage drinking apparatus is pivoted about the fulcrum with the curved portion engaged with the bottom surface of the beverage can. The piercing portion and the flow portion may be configured to penetrate the hole as the beverage drinking apparatus is further pivoted about the fulcrum such that liquid flows from the beverage can into the bore through the plurality of first apertures.

The beverage drinking apparatus may include a shroud. The shroud may extend from the spout. The pivot arm may extend from the shroud. The shroud may include a concave inner face that is configured to be proximate to the sidewall of the beverage can when the entry portion is received within the hole. A concavity of the concave face may correspond to a convexity of the sidewall of the beverage can. The beverage drinking apparatus may include a gasket that is configured to provide a seal between the hole and the shroud when the entry portion is received within the hole. The gasket may be located between the concave inner face and the sidewall of the beverage can when the entry portion is received within the beverage can. The gasket may include a plurality of second apertures proximate to a plurality of corresponding flaps (e.g., about a perimeter of the gasket). The shroud may define a plurality of tabs that are configured to be received within the plurality of second apertures for retaining the gasket to the shroud.

DETAILED DESCRIPTION

Figure 16:
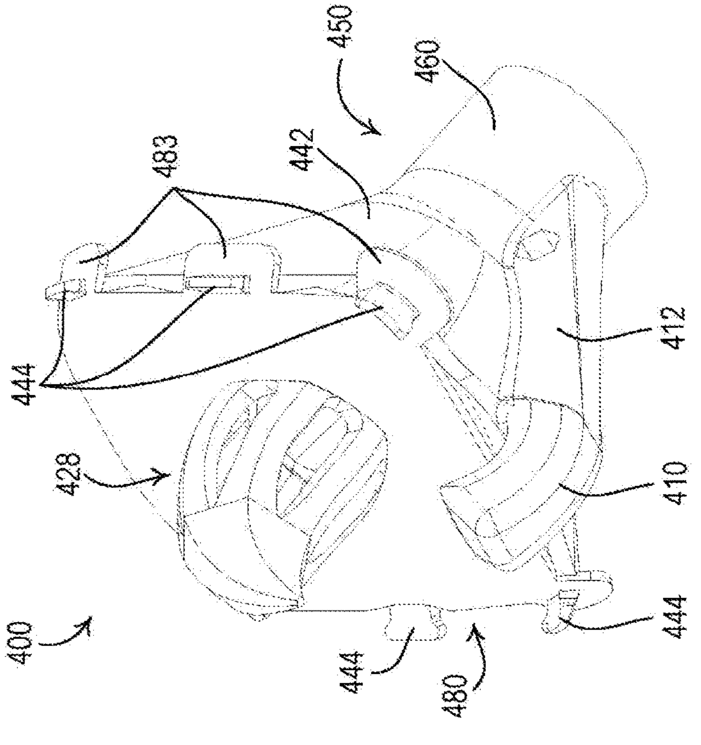
FIG. 16 is a front perspective view of another example beverage drinking apparatus for dispensing a liquid from a beverage can.

FIGS. 1-10 depict an example beverage drinking apparatus 100 for dispensing a liquid from a beverage can. The beverage drinking apparatus 100 (e.g., a shotgunning device or a shotgunning apparatus) may be capable of piercing a sidewall of a beverage can (e.g., an aluminum can or a drink can) and allow liquid (e.g., a beverage or beer) to flow out of the beverage can. The beverage drinking apparatus 100 may comprise an entry portion 128, a spout 160, a pivot arm 112, and a shroud 142. The beverage drinking apparatus 100 may comprise a variety of materials, for example, such as plastic, rubber, metal, metal coated rubber, glass, composites, and/or the like. The beverage drinking apparatus 100 may comprise multiple materials. The beverage drinking apparatus 100 may be configured such that the entry portion 128 pierces a hole in and enters the beverage can when a user rotates the beverage drinking apparatus 100 about a fulcrum (e.g., such as the axis of rotation A1 shown in FIG. 16) defined by the pivot arm 112. The pivot arm 112 may abut the bottom of the can when the entry portion 128 pierces a hole in and enters the beverage can. The user may rotate the beverage drinking apparatus until the shroud 142 abuts (e.g., interfaces with, is adjacent to, or proximate to) the sidewall of the beverage can. When the entry portion 128 enters the beverage can, liquid may flow through the beverage drinking apparatus 100 and come out via the spout 160.

The beverage drinking apparatus may comprise an entry portion 128 (e.g., entry member or entry arm). The entry portion 128 may comprise a piercing portion 122 (e.g., piercing member or piercing arm) and a flow portion 124 (e.g., second portion, aperture portion, and/or opening portion). The piercing portion 122 may be a distal end of the entry portion 128 relative to the shroud 142. The flow portion 124 may be a proximate end of the entry portion 128 relative to the shroud 142. The piercing portion 122 may abut, be joined to, and/or fixedly attached to the flow portion 124 at an abutment location 129 (e.g., joining location). In examples, the entry portion 128 may have only a piercing portion 122 or a flow portion 124. In examples, the piercing portion 122 and the flow portion 124 may be coextensive.

The entry portion 128 (e.g., the piercing portion 122 and/or the flow portion 124) may define a polygonal cross-section, a rounded polygonal cross-section, an elliptical cross-section, a circular cross-section, and/or the like. Examples of a polygonal cross-section may be, but are not limited to, triangular, rectangular, pentagonal, hexagonal, heptagonal, octagonal, and so on, either as regular or irregular polygons. The entry portion 128 (e.g., the piercing portion 122, and/or the flow portion 124) may define a plurality of faces 121 that define the polygonal cross-section. The entry portion 128 may define edges 123 between each of the faces 121. For example, the entry portion 128 may have six outer faces 121 that define a hexagonal cross-section. A polygonal cross-section may be preferable to a circular cross-section. For example, a polygonal cross-section may allow the entry portion 128 to more easily enter the sidewall of a beverage can and/or may enable the entry portion 128 to pierce the beverage can without denting the sidewall. The entry portion 128 being configured to pierce the beverage can without denting the sidewall may prevent leakage between the beverage drinking apparatus 100 and the sidewall.

The piercing portion 122 may be configured as a punch and may be configured to pierce (e.g., punch through, create a hole in, and/or enter) the sidewall of the beverage can. For example, the piercing portion 122 may comprise a tip 120. The tip 120 may be configured to pierce the sidewall of the beverage can and allow the piercing portion 122 to penetrate the sidewall of the beverage can. The piercing portion 122 may define a reduced cross-section when compared to the flow portion 124. For example, the piercing portion may define a gradual reduction in cross-sectional area from the flow portion 124 to the tip 120. The tip 120 may be a point, a rounded point, or any other such configuration, for example, to optimize penetration of the sidewall. For example, a reduction in surface area (e.g., an increase in the sharpness of the tip 120) of the tip 120 that contacts the sidewall of the beverage can may correspond to an increase in pressure applied by the tip 120 when the same amount of force is applied to the beverage drinking apparatus 100. When the tip 120 defines a sharper point, less force may be required to pierce the sidewall of the beverage can than when the tip 120 defines a less sharp point. A variety of materials may be used to construct the tip 120 including but not limited to metals, plastics, composites, etc. When the tip 120 is made from a material having a hardness greater than a threshold hardness may enable the beverage drinking apparatus 100 to pierce the sidewall without deforming. In examples, the threshold hardness may be approximately 60 hardness Rockwell C (HRC). Additionally or alternatively, the tip 120 may comprise serrated edges that are configured to enable the beverage drinking apparatus 100 to pierce the sidewall with a lower amount of force.

The flow portion 124 may allow liquid from the beverage can to flow through the beverage drinking apparatus 100. For example, the flow portion 124 may comprise a plurality of apertures 126 (e.g., openings). The apertures 126 may define a plurality of supporting members 125 that extend between the piercing portion 122 and the shroud 142. Each of the supporting members 125 may be located at edges 123 between adjacent faces 121 of the piercing portion 122. Although the apertures 126 are shown having an elliptical shape in the figures, it should be appreciated that the apertures 126 may have a different orientation, size, shape or number than depicted herein. Although the flow portion 124 is shown with six apertures 126, it should be appreciated that the flow portion 124 may include more or less than six apertures 126. For example, the number of apertures 126 may correspond to the cross-section (e.g., three for trigonal, seven for heptagonal, and/or the like). Each of the plurality of apertures may be configured to allow liquid to flow out of the beverage can and through the beverage drinking apparatus 100. For example, if the entry portion 128 is inserted into a beverage can, the apertures 126 may be partially or completely inserted into the beverage can. If the beverage can has liquid in it, the apertures 126 may be configured to allow liquid to flow out of the beverage can through the beverage drinking apparatus 100. The rate of flow and amount of liquid that flows through the apertures 126 may depend on the orientation of the beverage can and/or whether another opening has been created in the beverage can (e.g., via a pop top).

The beverage drinking apparatus 100 may allow the user to consume liquid flowing through the beverage drinking apparatus via the spout 160. The liquid may flow from the beverage can through the apertures 126 into a bore 162 and through the spout 160. For example, the bore 162 may extend from the flow portion 124 to the spout 160. In examples, the user may consume the liquid flowing through the beverage drinking apparatus 100 by direct communication between the user and a spout 160 (e.g., an end or a mouthpiece) of the beverage drinking apparatus 100 itself. In examples, the user may consume the liquid flowing through the beverage drinking apparatus 100 after it flows out of the spout 160 (e.g., the end or the mouthpiece) of the beverage drinking apparatus 100, such as in a waterfall manner or a tube which may be either removably or fixedly attached to the spout 160 (e.g., the end or the mouthpiece) of the beverage drinking apparatus 100.

The bore 162 may be sized to allow for a predetermined flow rate of liquid from the beverage can. In examples, the bore 162 may define a larger diameter to allow the liquid to flow faster from the beverage can through the beverage drinking apparatus 100. In examples, the bore 162 may define a smaller diameter to reduce the flow rate of the liquid from the beverage can through the beverage drinking apparatus 100. The diameter of the bore 162 may be constrained by an outer diameter of the spout 160. For example, the spout 160 may define an outer diameter that is configured based on an average mouth size and/or comfort of an average user. Additionally or alternatively, the outer diameter of the spout 160 and/or the diameter of the bore 162 may be sized for a specific user in mind. Additionally or alternatively, the diameter of the bore 162 and/or the outer diameter of the spout 160 may be constrained by the cross-sectional area (e.g., outer diameter) of the entry portion 128. For example, the diameter of the bore 162 and/or the outer diameter of the spout 160 may be determined based on the cross-sectional area (e.g., outer diameter) of the entry portion 128.

The beverage drinking apparatus 100 may comprise a pivot arm 112 that extends from the spout 160 and/or the shroud 142. For example, the pivot arm 112 may be attached to the spout 160 and/or the shroud 142. The pivot arm 112 may be referred to as a hooking arm, a latching arm, a rotation arm, and/or a fulcrum arm. The pivot arm 112 may comprise a curved portion 110 (e.g., hook or latching member). The curved portion 110 may be curved upward toward the entry portion 128. The curved portion 110 may be configured to abut (e.g., contact) a bottom surface of a beverage can. For example, the curved portion 110 may be configured to abut a lip or an edge on a bottom surface of a beverage can. The curved portion 110 may define the fulcrum (e.g., axis of rotation) for rotating the beverage drinking apparatus 100. For example, the fulcrum may be located where the curved portion 110 abuts the bottom surface of the beverage can. The beverage drinking apparatus 100 may be configured to pivot about the fulcrum defined by the abutment of the curved portion 110 with the bottom surface of the beverage can. The entry portion 128 may be configured to abut a sidewall of the beverage can, for example, when the beverage drinking apparatus 100 is pivoted about the fulcrum defined by the engagement of the curved portion 110 with the bottom surface of the beverage can. When the entry portion 128 is in contact with the sidewall of the beverage can, the entry portion 128 may pierce the sidewall of the beverage can when the beverage drinking apparatus 100 is further pivoted, for example, in response to a force applied to the beverage drinking apparatus 100.

When the beverage drinking apparatus 100 is pivoted about the fulcrum defined by the engagement of the curved portion 110 with the bottom surface of the beverage can, the beverage drinking apparatus 100 may continue pivoting past the point when the entry portion 128 engages the sidewall of the beverage can. For example, after the entry portion 128 pierces the sidewall of the beverage can, the entry portion 128 may enter the beverage can. The entry portion 128 may enter the beverage can until the front surface 140 of the shroud 142 engages and/or is proximate to the sidewall of the beverage can. The front surface 140 of the shroud 142 may be concave, for example, to correspond to the sidewall of the beverage can. The concavity of the front surface 140 may correspond to the convexity of the sidewall of the beverage can. For example, beverage cans have a variety of diameters, and if an example beverage can has a certain diameter, the front surface 140 may be configured to correspond with the certain diameter. For example, a tall slim can may be 6.125 inches tall and 2.25 inches in diameter while a standard can may be 4.83 inches tall and 2.6 inches in diameter. The curve of the front surface 140 may be configured to correspond to a 2.25 inch diameter or a 2.6 inch diameter. In examples the shroud 142 and/or the front surface 140 may comprise flexible material(s). In such examples, the front surface 140 may be configured to correspond to the convexity of a plurality of different diameter cans. For instance, a flexible shroud 142 may be manipulated by a user to hold a certain diameter for at least a period of time. Alternatively, the flexible shroud 142 may be configured with a smaller diameter than necessary and flex outwards when engaging or proximate to the sidewall of a beverage can.

Although the figures show the pivot arm 112 extending from the shroud 142 and the spout 160 and comprising a curved portion 110, it should be appreciated that the curved portion 110 may be the entire pivot arm 112 such that the curved portion 110 extends from the shroud 142 and/or the spout 160.

The beverage drinking apparatus 100 may comprise a grip area 152. For example, the grip area 152 may define an area of the beverage drinking apparatus 100 configured to enable a user to more easily grasp and/or grip the beverage drinking apparatus 100. The grip area 152 may be textured with ridges 150. Although the grip area 152 is shown with ridges 150 in the figures, it should be appreciated that the grip area 152 may be alternatively textured, such as with bumps, grooves, roughening, and/or a "flat" area (e.g., an area parallel with the sidewall of the beverage can when the entry portion is inserted). The ridges 150 may be configured to prevent a user's finger(s) from sliding as the user presses the beverage drinking apparatus 100 into engagement with and/or through the beverage can. For example, the grip area 152 may be configured to receive a portion of the force that pivots the pivoting arm 112 and/or pierces the beverage can. In examples, the beverage drinking apparatus 100 (e.g., the shroud 142) may be textured such that the grip area 152 is excluded from the beverage drinking apparatus 100.

The beverage drinking apparatus 100 may comprise a keychain hole 172. The keychain hole 172 may be configured to receive a ring (e.g., a keychain ring). The keychain hole 172 may allow a user to attach the beverage drinking apparatus 100 to, for example, a lanyard, a keychain, and/or the like. Although not depicted, the beverage drinking apparatus 100 may further comprise a bottle opener. For example, the bottle opener may be a member extending downwards from the spout 160.

The beverage drinking apparatus 100 may include a plurality of pivot arm ridges 174. The pivot arm ridges 174 may define a secondary grip area. For example, the secondary grip area may define an area of the beverage drinking apparatus 100 configured to enable a user to more easily grasp and/or grip a lower portion of the beverage drinking apparatus 100. For example, the secondary grip area may comprise a different material (e.g., rubber and/or the like) which a user may more easily grip. Additionally or alternatively, the secondary grip area may include a different texture than the other outer surfaces of the beverage drinking apparatus 100. Although the figures depict ridges 174 on the pivot arm 112, it should be appreciated that the pivot arm may be textured using one or more of bumps, grooves, roughening, and/or a "flat" area (e.g., an area parallel with the sidewall of the beverage can when the entry portion is inserted). The pivot arm ridges 174 may be configured to prevent a user's finger(s) from sliding off of the pivot arm 112 as the user presses the beverage drinking apparatus 100 into engagement with and/or through the beverage can. For example, the pivot arm ridges 174 may be configured to receive a portion of the force that pivots the pivoting arm 112 and/or pierces the beverage can. In examples, the beverage drinking apparatus 100 (e.g., the pivot arm 112) may be textured such that the pivot arm ridges are excluded from the beverage drinking apparatus 100. Although the figures depict the beverage drinking apparatus 100 as having two grip areas, it should be appreciated that any number of grip areas may be utilized in any number of positions. For example, the beverage drinking apparatus 100 may comprise grip areas to the left and right of the spout 160 (e.g., instead of to the top and bottom or in addition to the top and bottom).

The beverage drinking apparatus 100 may define a lip 111 on the bottom portion of the front surface 140. The lip 111 may be configured to interface with (e.g., engage and/or be proximate to) a bottom edge of the beverage can. For example, the curved portion 110 may abut a bottom flange on a standard beverage can, and the lip 111 may be configured to abut a curve between the bottom flange and the sidewall of the standard beverage can.

A cross-sectional area defined by the entry portion 128 may increase (e.g., increase in diameter) from the tip 120 to an intermediate location 127 on the flow portion 124. The intermediate location 127 may be configured to be aligned with the sidewall of the beverage can when the entry portion 128 is fully inserted into (e.g., seated within) the beverage can. The cross-sectional area (e.g., diameter) of the entry portion 128 (e.g., flow portion 124) may be configured to decrease from the intermediate location 127 to a plane defined by the front surface 140 of the shroud 142 proximate to the entry portion 128. The increasing width (e.g., diameter) followed by a decrease in width (e.g., diameter) may allow the entry portion 128 to increase the width of a hole in the sidewall of the beverage can and then allow the material (e.g., aluminum) of the sidewall to prevent the entry portion 128 from being removed (e.g., easily removed) from the hole in the sidewall. Allowing the material of the sidewall to rebound may reduce stress in the sidewall which may manifest itself in the form of bends and/or tears in the sidewall, either or both of which may decrease the efficacy of the beverage drinking apparatus 100 by creating a gap or gaps between the edge of the entry portion 128 and the edge of the sidewall of the beverage can. Additionally or alternatively, allowing the material of the sidewall to rebound may prevent disengagement of the beverage drinking apparatus 100 from the beverage can, which may decrease the efficacy of the beverage drinking apparatus 100 by creating a gap or gaps between the sidewall of the beverage can and the front surface 140 of the shroud 142 and/or a gasket attached to the shroud 142 (e.g., such as gasket 180 shown in FIG. 9-10, the gasket 280 shown in FIG. 11, the gasket 380 shown in FIGS. 12-15, and/or the gasket 480 shown in FIGS. 16-19). Gaps between the edge of the entry portion 128 and the edge of the sidewall of the beverage can may allow liquid within the beverage can to flow around the beverage drinking apparatus 100 instead of through the beverage drinking apparatus 100. Gaps between the sidewall of the beverage can and the front surface 140 of the shroud 142 and/or a gasket attached to the shroud 142 may allow liquid within the beverage can to flow around the beverage drinking apparatus 100 instead of through the beverage drinking apparatus 100. Friction between the entry portion 128 and the hole in the sidewall may be configured to retain the beverage drinking apparatus 100 in attachment with the beverage can.

The beverage drinking apparatus 100 may be configured to receive an example gasket 180. The gasket 180 may be removably attached to the beverage drinking apparatus 100. The gasket 180 may be configured to form a seal between the beverage drinking apparatus 100 (e.g., the front surface 140 of the shroud 142) and the sidewall of the beverage can. The gasket 180 may be configured to be located between the front surface 140 (e.g., such that the gasket 180 engages the sidewall of the beverage can and the front surface 140 is proximate to the sidewall of the beverage can) when the entry portion 128 is inserted into the beverage can. The gasket 180 may be formed of flexible material (e.g., such as rubber). For example, a shape of the gasket 180 may be configured to correspond to the shape of the front surface 140 of the shroud 142. The gasket 180 may be configured to wrap around (e.g., conform to) the sidewall of the beverage can. The gasket 180 may be configured to prevent liquid from leaking between the beverage can and the beverage drinking apparatus 100. Reducing or preventing leaking may increase the amount of liquid that can successfully be transferred from the beverage can through the beverage drinking apparatus 100. Reducing or preventing leaking may also enhance user experience by reducing or preventing liquid from the beverage leaking onto the user, for example, while the user is drinking from the spout 160.

The gasket 180 may define a hole 181. The hole 181 may be configured to receive the entry portion 128. The hole 181 may be configured to create a seal between the gasket 180 and the entry portion 128. For example, the hole 181 of the gasket 180 may be configured such that its diameter is less than a maximum diameter of the entry portion 128. The gasket 180 may define a flange 182 that extends from a perimeter of the hole 181. The shroud 142 may define a recess 190. The recess 190 may surround the entry portion 128. The recess 190 may begin at the front surface 140 and may extend into the shroud 142. The recess 190 may be configured to receive a portion of the gasket 181. For example, the recess 190 may be configured to receive the flange 182. The flange 182 may be configured to provide a seal around the entry portion 128 (e.g., the flow portion 124). The flange 182 and/or the hole 181 may be polygonal (e.g., hexagonal), for example, to correspond with a shape of the entry portion 128. When the entry portion 128 is fully seated through the hole 181 in the gasket 180, the gasket 180 may be seated in the recess 190. The flange 182 may comprise a notch 184. The notch 184 may be configured to fit around (e.g., engage) a tab 191 within the recess 190. The tab 191 may be located within the recess between the bore 162 and the pivot arm 112. The tab 191 may be configured to prevent the gasket 180 from rotating around the entry portion 128. For example, the notch 184 and the tab 191 may be configured to align the gasket 180 to the beverage drinking apparatus 100. Friction between the entry portion 128 and the hole 281 and/or the flange 182 may retain the gasket 180 to the beverage drinking apparatus 100.

Figure 1:
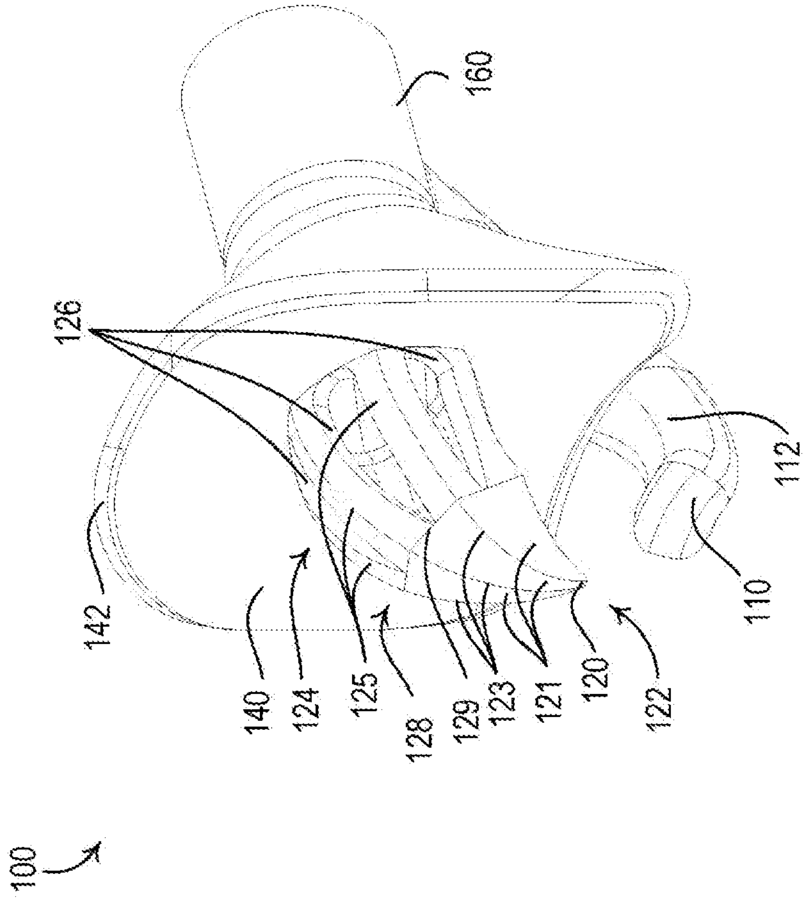
FIG. 1 is a front perspective view of an example beverage drinking apparatus for dispensing a liquid from a beverage can.
Figure 2:
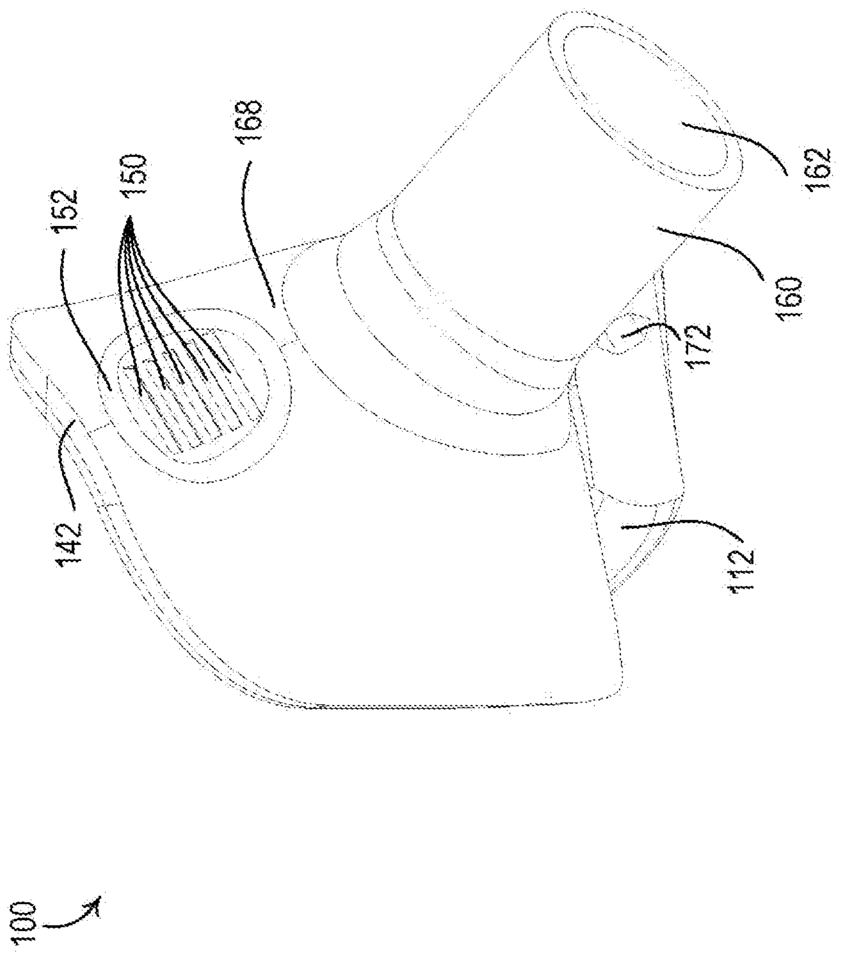
FIG. 2 is a rear perspective view of the example beverage drinking apparatus shown in FIG. 1.
Figure 3:
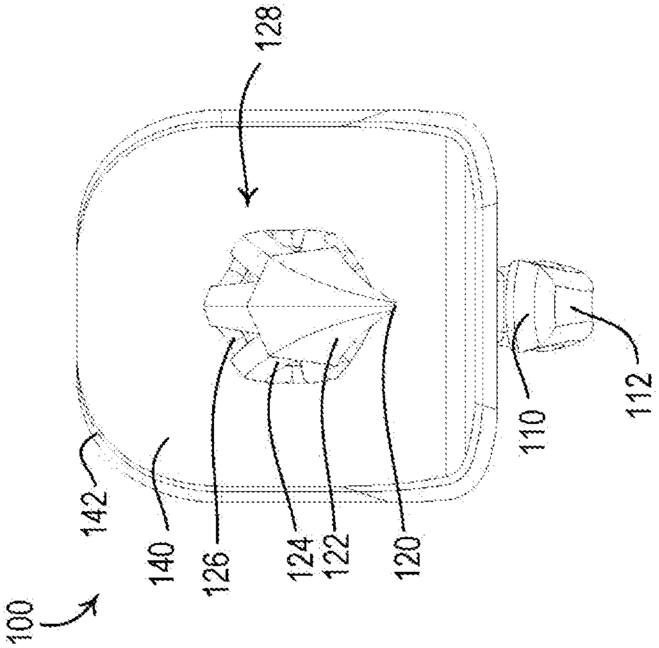
FIG. 3 is a front view of the example beverage drinking apparatus shown in FIG. 1.
Figure 4:
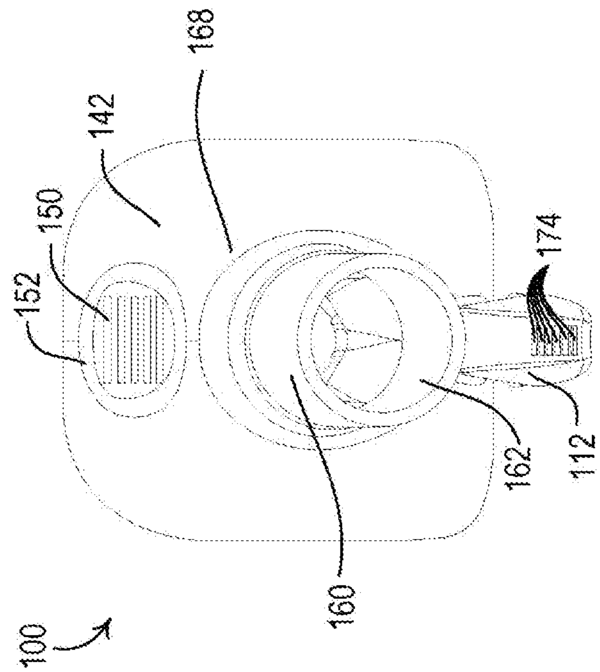
FIG. 4 is a rear view of the example beverage drinking apparatus shown in FIG. 1.
Figure 5:
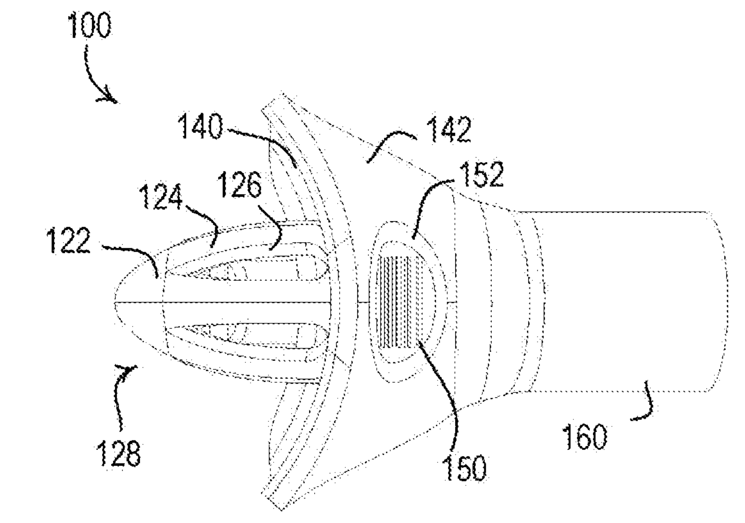
FIG. 5 is a top view of the example beverage drinking apparatus shown in FIG. 1.
Figure 6:
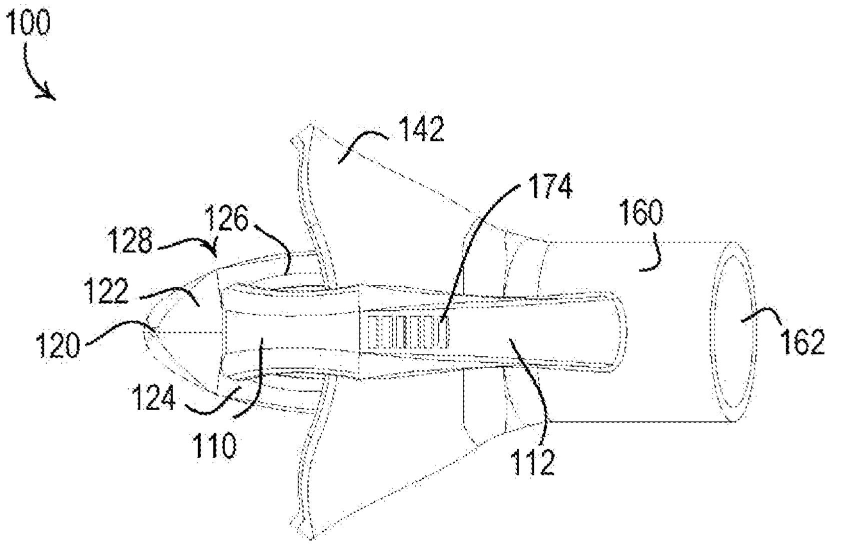
FIG. 6 is a bottom view of the example beverage drinking apparatus shown in FIG. 1.
Figure 8:
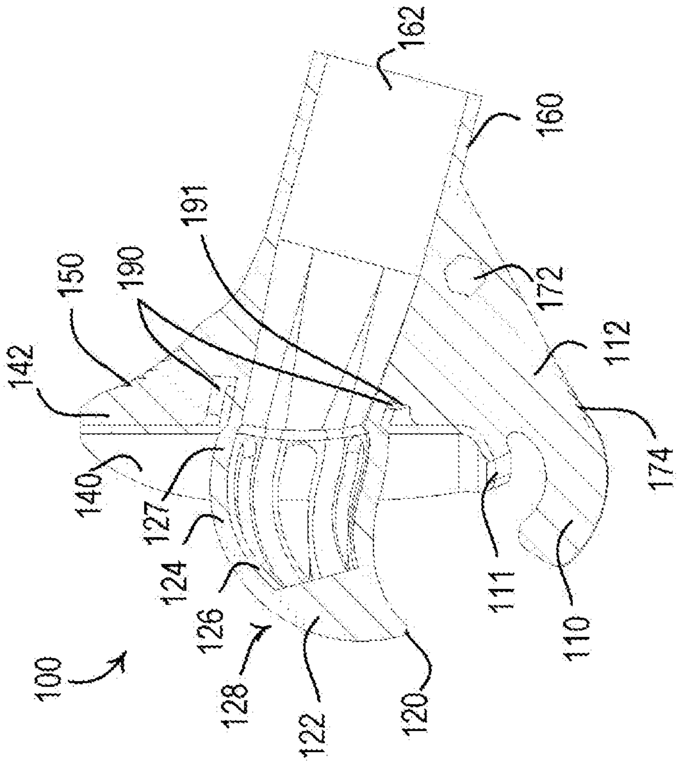
FIG. 8 is a side cross-section view of the example beverage drinking apparatus shown in FIG. 1.
Figure 7:
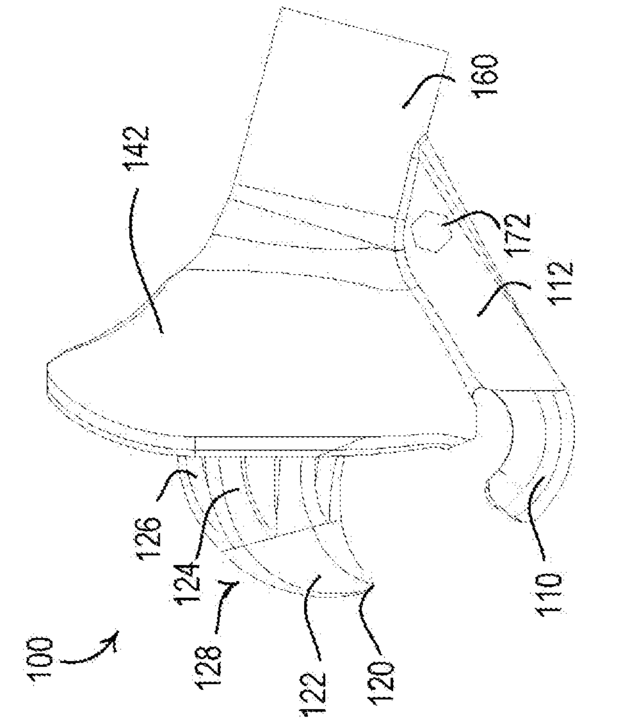
FIG. 7 is a side view of the example beverage drinking apparatus shown in FIG. 1.
Figure 9:
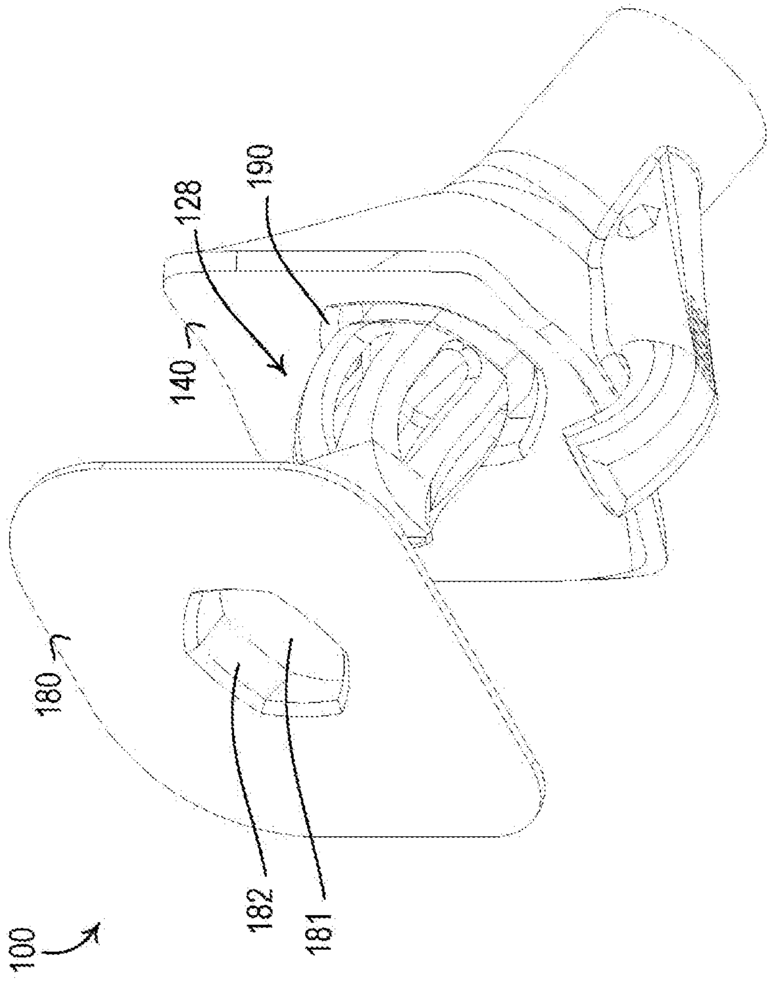
FIG. 9 is a front exploded view of the example beverage drinking apparatus shown in FIG. 1 with an example gasket.
Figure 10:
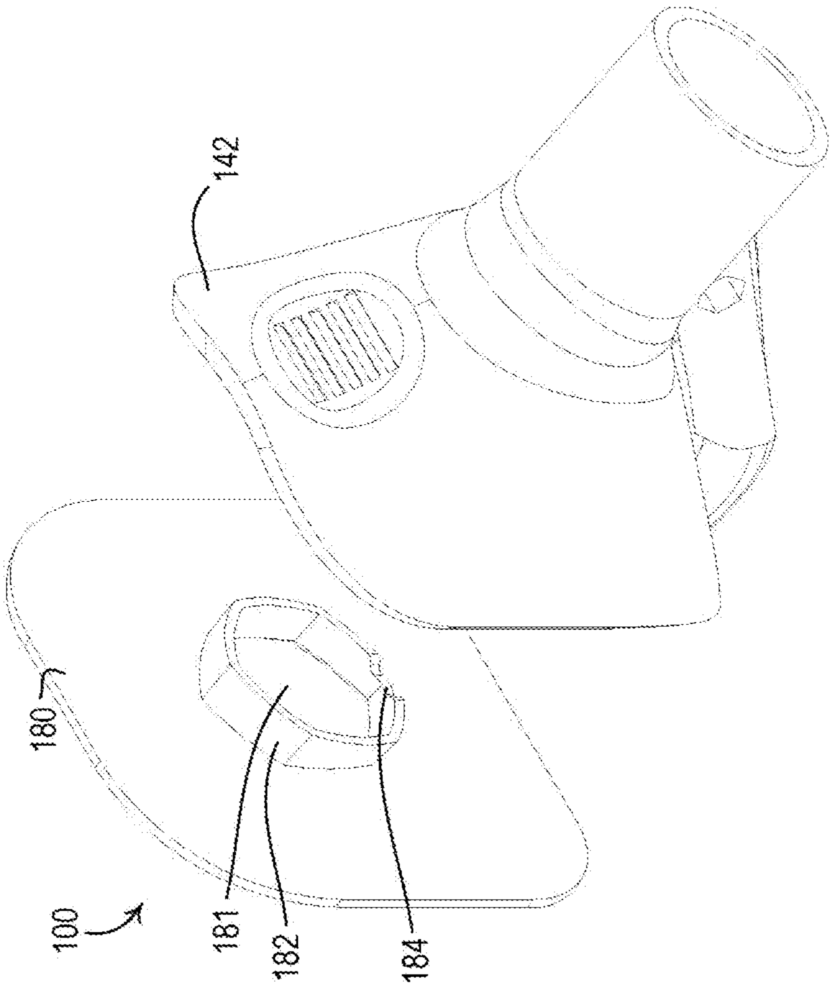
FIG. 10 is a rear exploded view of the example beverage drinking apparatus shown in FIG. 1 with the example gasket.
Figure 11:
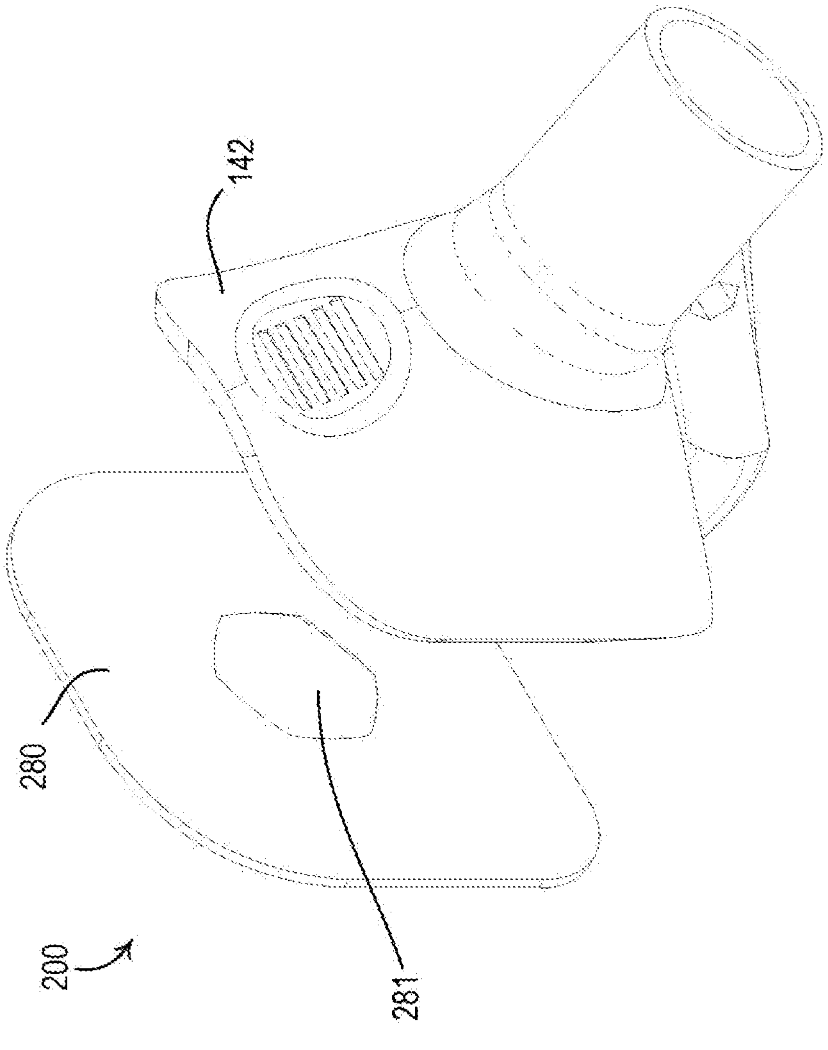
FIG. 11 is a rear exploded view of another example beverage drinking apparatus with another example gasket.
Figure 13:
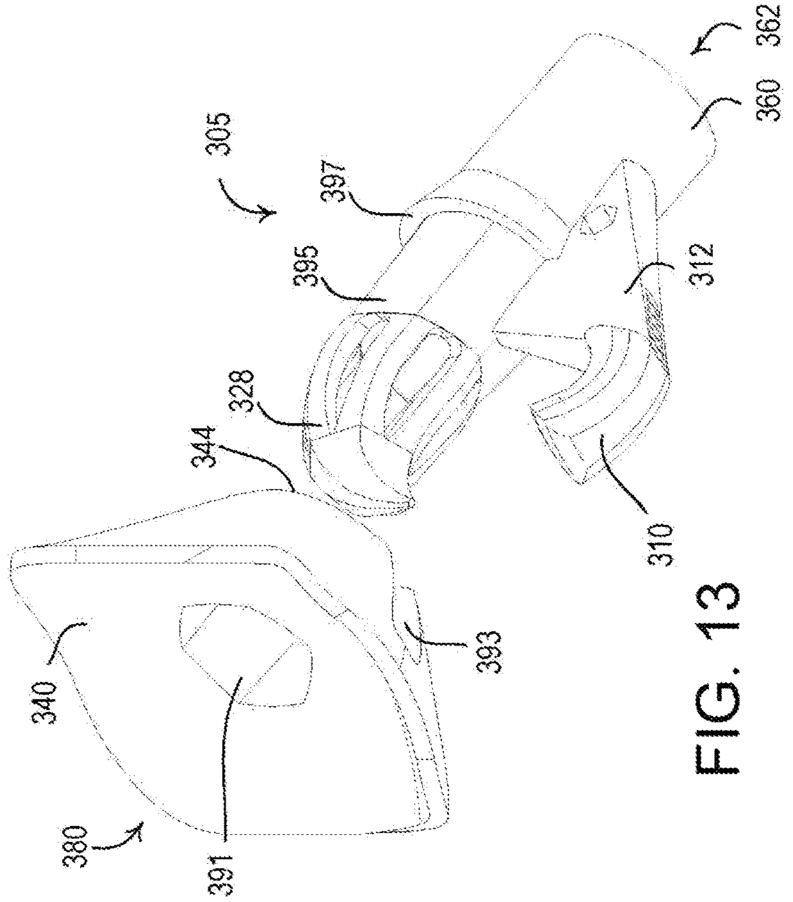
FIG. 13 is an exploded view of the example beverage drinking apparatus shown in FIG. 12.
Figure 12:
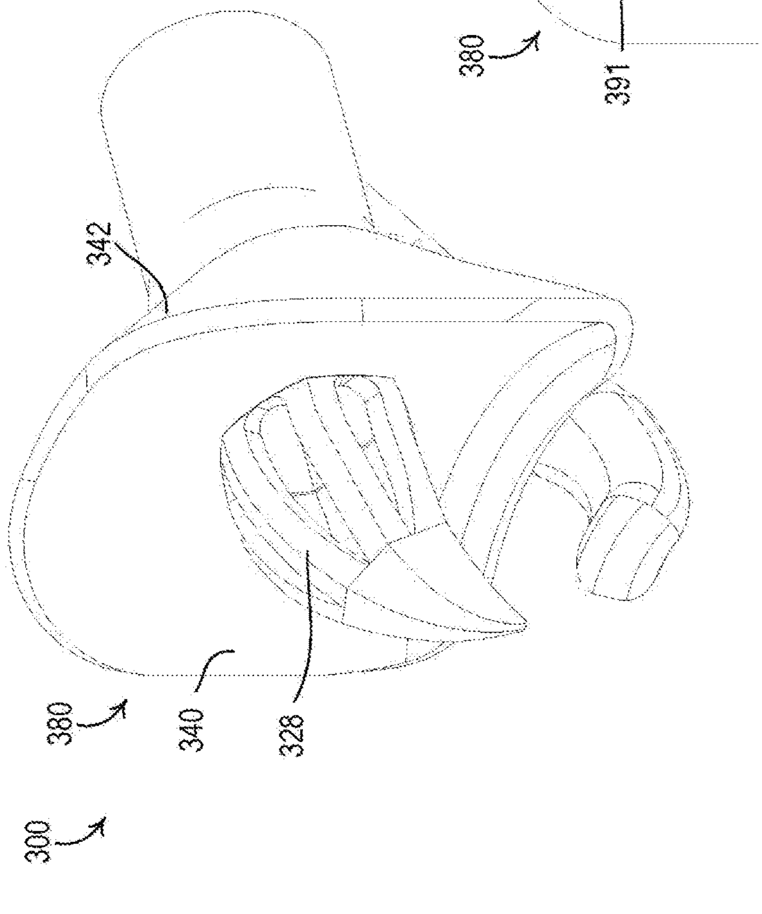
FIG. 12 is a front perspective view of another example beverage drinking apparatus for dispensing a liquid from a beverage can.
Figure 14:
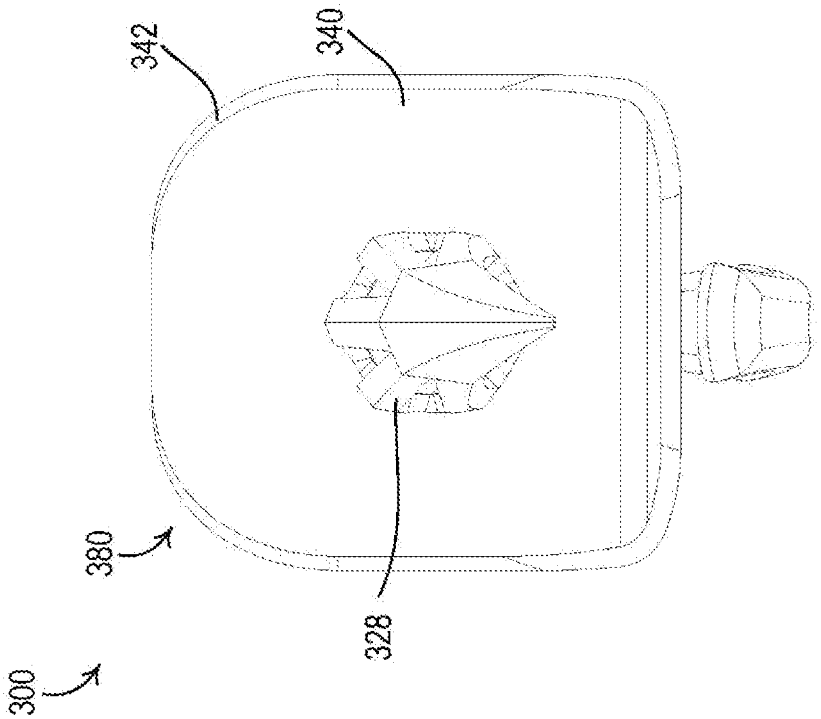
FIG. 14 is a front view of the example beverage drinking apparatus shown in FIG. 12.
Figure 15:
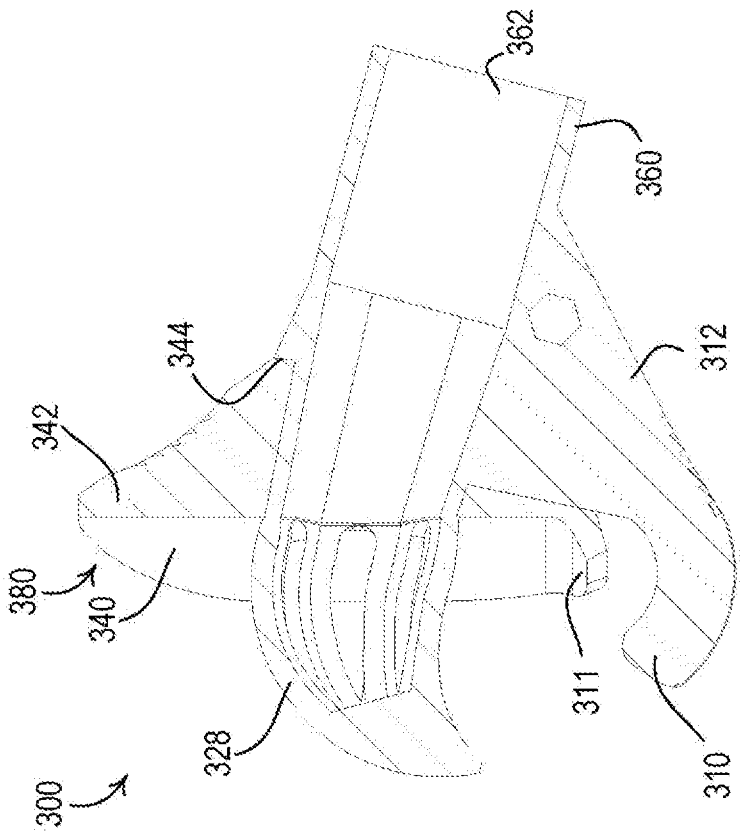
FIG. 15 is a side cross-section view of the example beverage drinking apparatus shown in FIG. 12.
Figure 17:
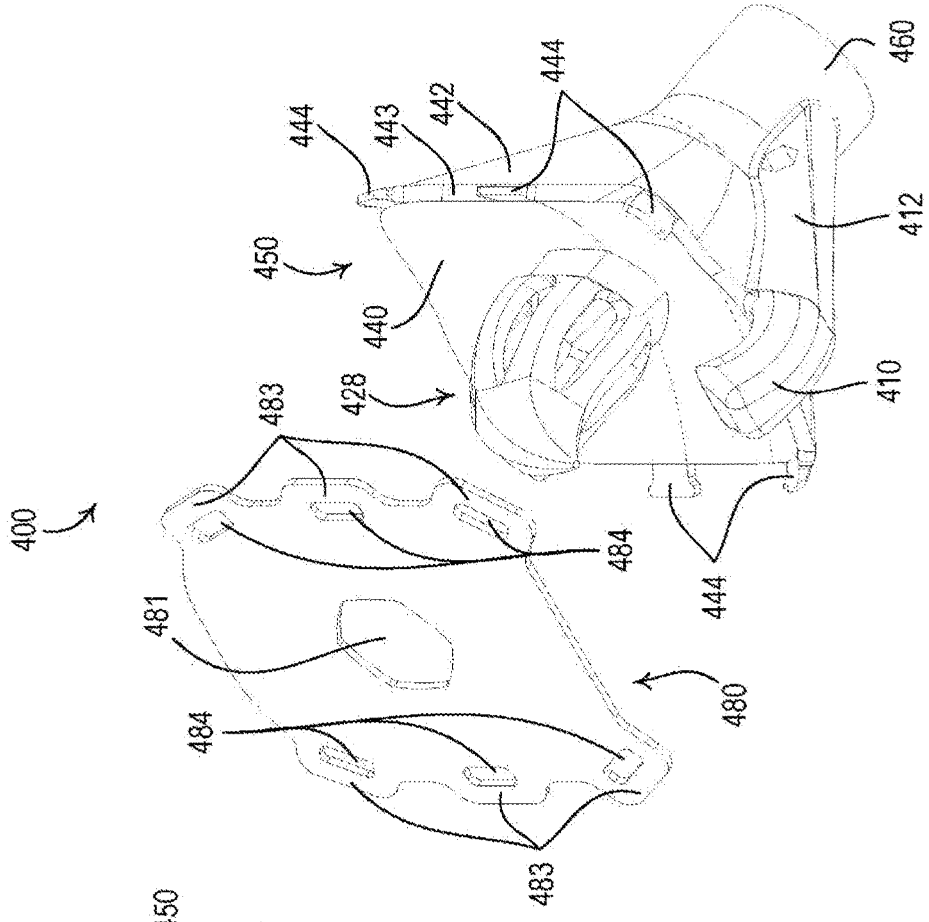
FIG. 17 is an exploded view of the example beverage drinking apparatus shown in FIG. 16.

FIG. 11 depicts another example beverage drinking apparatus 200 (e.g., such as the beverage drinking apparatus 100 shown in FIGS. 1-10) having another example gasket 280. The gasket 280 may be removably attached to the beverage drinking apparatus 200. The gasket 280 may be configured to form a seal between the beverage drinking apparatus 200 (e.g., the front surface 140 of the shroud 142) and the sidewall of the beverage can. The gasket 280 may be configured to be located between the front surface 140 (e.g., such that the gasket 280 engages the sidewall of the beverage can and the front surface 140 is proximate to the sidewall of the beverage can) when the entry portion 128 is inserted into the beverage can. The gasket 280 may be formed of flexible material (e.g., such as rubber). For example, a shape of the gasket 280 may be configured to correspond to the shape of the front surface 240 of the shroud 242. The gasket 280 may be configured to wrap around (e.g., conform to) the sidewall of the beverage can. The gasket 280 may be configured to prevent leaking between the beverage can and the beverage drinking apparatus 200. Reducing or preventing leaking may increase the amount of liquid that can successfully be transferred from the beverage can through the beverage drinking apparatus 200. Reducing or preventing leaking may also enhance user experience by reducing or preventing liquid from the beverage leaking onto the user, for example, while the user is drinking from the spout 160.

The gasket 280 may define a hole 281. The hole 281 may be configured to receive the entry portion 128. The hole 281 may be configured to create a seal between the gasket and the entry portion 128. For example, the hole 281 of the gasket 280 may be configured such that its diameter is less than a maximum diameter of the entry portion 128. Friction between the entry portion 128 and the hole 281 may retain the gasket 280 to the beverage drinking apparatus 200. Unlike the gasket 180, the gasket 280 may lack a flange. The gasket 280 may not require the flange to stay in place and/or to achieve a seal (e.g., a comparable or effective seal). Additionally or alternatively, the beverage drinking apparatus 200 may lack a recess such as the recess 190 shown in FIG. 9.

FIGS. 12-15 depict another example beverage drinking apparatus 300 (e.g., such as the beverage drinking apparatus 100 shown in FIGS. 1-10 and/or the beverage drinking apparatus 200 shown in FIG. 11) for dispensing a liquid from a beverage can. The beverage drinking apparatus 300 may define a main body 305 and a gasket 380. The main body 305 may include a spout 360 (e.g., such as the spout 160 shown in FIGS. 1-11), a bore 362 (e.g., such as the bore 162 shown in FIGS. 1-11), a pivot arm 312 (e.g., such as the pivot arm 112 shown in FIGS. 1-11), an entry portion 328 (e.g., such as the entry portion 128 shown in FIGS. 1-10), and a middle portion 395. The gasket 380 may be configured to be removably attached to the main body 305 of the beverage drinking apparatus 300. For example, the gasket 380 may include an orifice 391 that is configured to fit over the entry portion 328. The orifice 391 may be defined through a front surface 340 of the gasket 380. The gasket 380 may include a notch 393 that is configured to receive a portion of the pivot arm 312. The notch 393 may be defined through a rear surface 344 of the gasket 380. The main body 305 (e.g., the middle portion 395) may define a flange 397. The flange 397 may define a surface that is substantially perpendicular to the bore 362. The flange 397 may extend at least partially around the middle portion 395. The gasket 380 may abut (e.g., interface with and/or engage with) the flange 397. For example, the gasket 380 (e.g., the rear surface 344) may abut the flange 397 when attached to the main body 305 of the beverage drinking apparatus 300. Friction between the entry portion 328 and the orifice 391 may retain the gasket 380 to the main body 350.

The gasket 380 may define a lip 311 on the bottom portion of the front surface 340. The lip 311 may be configured to interface with (e.g., engage and/or be proximate to) a bottom edge of the beverage can. For example, the pivot arm 312 may abut a bottom flange on a standard beverage can, and the lip 311 may abut a curve between the bottom flange and the sidewall of the standard beverage can.

The gasket 380 may be partially or completely comprised of a different material than the main body 305 of the beverage drinking apparatus 300. For example, the gasket 380 may be comprised of a flexible material (e.g., rubber). The gasket 380 may obviate the use of an additional component (e.g., a thin gasket) in order to form a seal with the sidewall of the beverage can. The gasket 380 may be configured to deform to mate with the sidewall of the beverage can. For example, the entire gasket 380 may be flexible and capable of deforming in response to an applied force. The gasket 380 may be capable of forming a seal with the sidewall of the beverage can. The front surface 340 may be configured to abut the sidewall of the beverage can. The gasket 380 may be configured to prevent liquid from flowing out of a hole created by the entry portion 328 when the entry portion 328 is inserted into the hole and/or when the front surface 340 abuts or is proximate to the sidewall of the beverage can.

FIGS. 16-19 depict another example beverage drinking apparatus 400 (e.g., such as the beverage drinking apparatus 100 shown in FIGS. 1-10, the beverage drinking apparatus 200 shown in FIG. 11, and/or the beverage drinking apparatus 300 shown in FIGS. 12-15) for dispensing a liquid from a beverage can 402. The beverage drinking apparatus 400 may include a main body 450 and a gasket 480. The main body 450 of the beverage drinking apparatus 400 may include a spout 460 (e.g., such as the spout 160 shown in FIGS. 1-11 and/or the spout 360 shown in FIGS. 12-15), a bore 462 (e.g., such as the bore 162 shown in FIGS. 1-11 and/or the bore 362 shown in FIGS. 12-15), a pivot arm 412 (e.g., such as the pivot arm 112 shown in FIGS. 1-11 and/or the pivot arm 312 shown in FIGS. 12-15), and an entry portion 428 (e.g., such as the entry portion 128 shown in FIGS. 1-10 and/or the entry portion 328 shown in FIGS. 12-15). The gasket 480 may be configured to be removably attached to the main body 450 of the beverage drinking apparatus 400. For example, the gasket 480 may include a hole 481 that is configured to receive the entry portion 428. Stated differently, the entry portion 428 may extend through the hole 481 when the gasket 480 is attached to the main body 450. The gasket 480 may include a plurality of flaps 483 about a perimeter of the gasket 480. The gasket 480 may include a plurality of apertures 484. The apertures 484 may be located proximate to the perimeter of the gasket 480. For example, each of the apertures 484 may be located proximate to a corresponding one of the flaps 483.

The main body 450 may define features that are configured to retain the gasket 480. For example, the main body 450 may define a plurality of (e.g., six) tabs 444 that extend from a perimeter of the shroud 442. The tabs 444 may extend from a front surface 440 of the shroud 442. Each of the apertures 484 may be configured to receive a corresponding one of the tabs 444. For example the tabs 444 may be configured to extend through the apertures 484 and prevent removal of the gasket 480 from the main body 450. A distal portion (e.g., distal from the shroud 442) of the tabs 444 may define wider cross-section than the connecting portion (e.g., at the intersection with the shroud 442) of the tabs 444. The apertures 484 may define a width that is less than the width of the distal portion of the tabs 444. The apertures 484 may be stretched to receive the distal portion of the tabs 444 and return to the resting width. For example, a user may pull a respective flap of the flaps 483 to stretch a respective aperture of the apertures 484 to fit over a respective tab of the tabs 444. The user may repeat for each of the tabs 444 and apertures 484. The gasket 480 may be removed from the main body 450 by grasping one or more of the flaps 483 to stretch the apertures 484 over the tabs 444.

Figure 18:
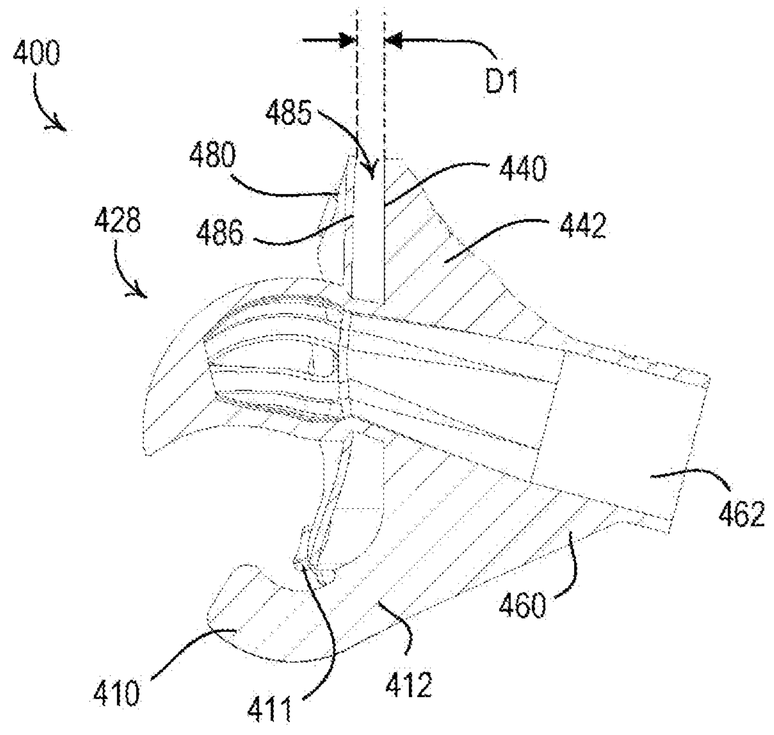
FIG. 18 is a side cross-section view of the example beverage drinking apparatus shown in FIG. 16.
Figure 19:
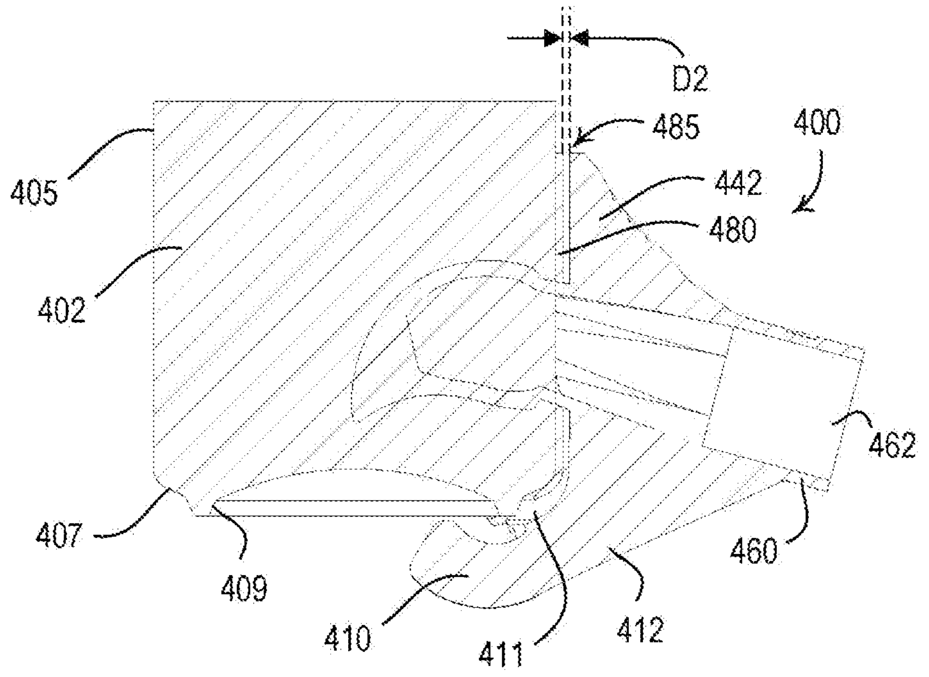
FIG. 19 is a side cross-section view of the example beverage drinking apparatus shown in FIG. 16 attached to a beverage can.

When the gasket 480 is attached to the main body 450, a rear surface 486 of the gasket 480 may be spaced a distance D1 from a front surface 440 of the shroud 442, for example, at a midpoint of the front surface (e.g., as shown in FIG. 18). As the beverage drinking apparatus 400 is rotated into contact with the beverage can 402, the rear surface 486 of the gasket 480 may be pushed closer to the front surface 440 of the shroud 442. For example, the sidewall 405 of the beverage can 402 may press the gasket 480 toward the shroud 442 such that the rear surface 486 of the gasket 480 is spaced a distance D2 from the front surface 440 of the shroud 442, for example, at a midpoint of the front surface (e.g., as shown in FIG. 19). The distance D1 may be greater than the distance D2.

Although the figures show the pivot arm 412 extending from the shroud 442 and the spout 460 and comprising a curved portion 410, it should be appreciated that the curved portion 410 may be the entire pivot arm 412 such that the curved portion 410 extends from the shroud 442 and/or the spout 460.

Figure 20:
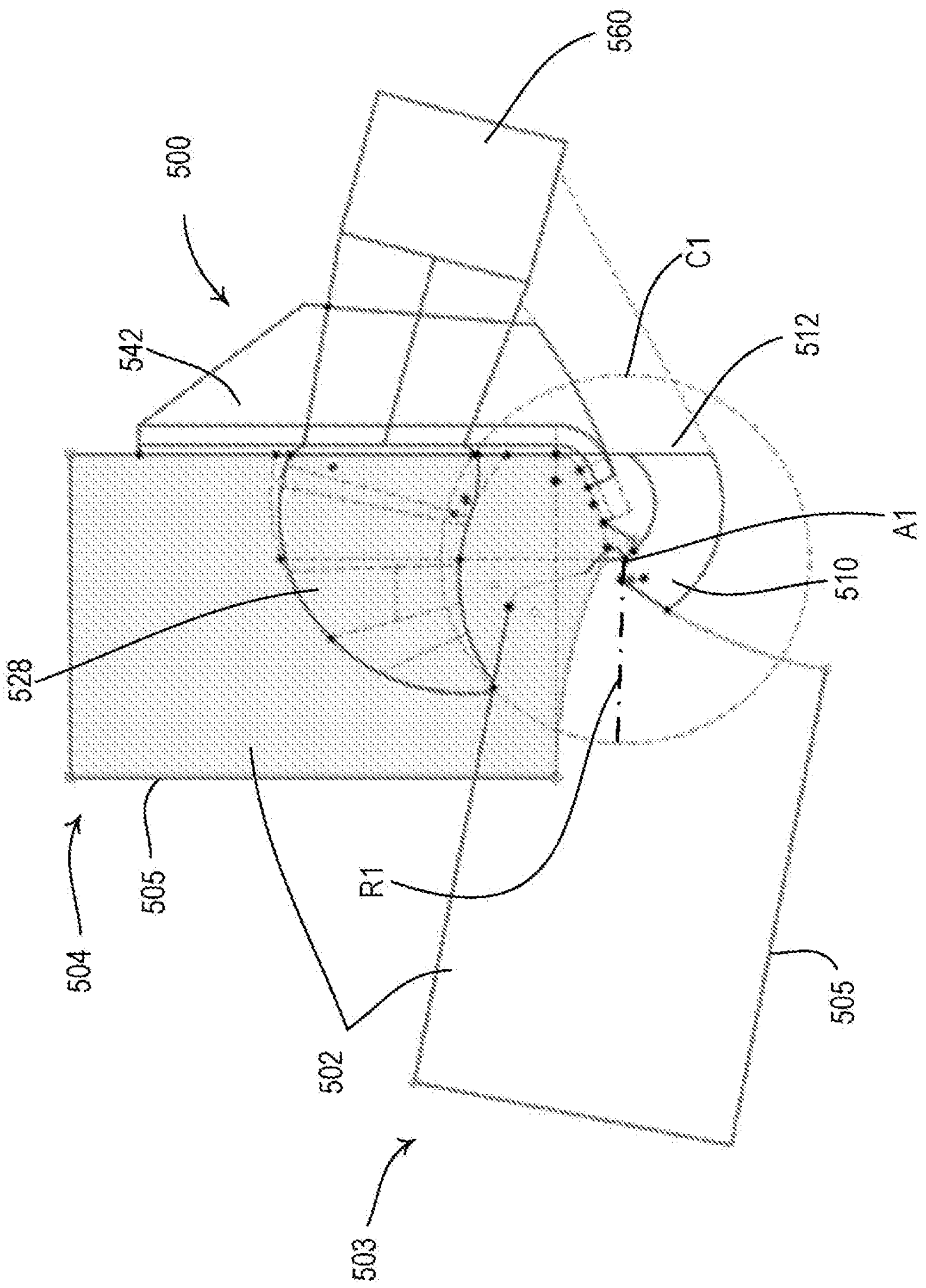
FIG. 20 is a simplified cross-section of another example beverage drinking apparatus for dispensing a liquid from a beverage can.

FIG. 20 is an example diagram of another example beverage drinking apparatus 500 (e.g., such as the beverage drinking apparatus 100 shown in FIGS. 1-10, the beverage drinking apparatus 200 shown in FIG. 11, the beverage drinking apparatus 300 shown in FIGS. 12-15, and/or the beverage drinking apparatus 400 shown in FIGS. 16-19) shown in multiple positions with respect to a beverage can 502. The beverage drinking apparatus 500 may include a spout 560 (e.g., such as the spout 160 shown in FIGS. 1-11, the spout 360 shown in FIGS. 12-15, and/or the spout 460 shown in FIGS. 16-19), a bore 562 (e.g., such as the bore 162 shown in FIGS. 1-11, the bore 362 shown in FIGS. 12-15, and/or the bore 462 shown in FIGS. 16-19), a pivot arm 512 (e.g., such as the pivot arm 112 shown in FIGS. 1-11, the pivot arm 312 shown in FIGS. 12-15, and/or the pivot arm 412 shown in FIGS. 16-19), an entry portion 528 (e.g., such as the entry portion 128 shown in FIGS. 1-10, the entry portion 328 shown in FIGS. 12-15, and/or the entry portion 428 shown in FIGS. 16-19).

A user may place the beverage can 502 in a first position 503 relative to the beverage drinking apparatus 500. In the first position 503, the curved portion 510 of the pivot arm 512 may abut a bottom surface (e.g., such as the bottom flange 409 shown in FIG. 19) of the beverage can 502. A user may then pivot the beverage can 502 relative to the beverage drinking apparatus 500 (e.g., pivot the beverage drinking apparatus 500 relative to the beverage can 502) from the first position 503 to a second position 504. The curved portion 510 may remain in contact with the bottom surface of the beverage can 502 as the beverage drinking apparatus 500 is pivoted from the first position 503 to the second position 504. The user may rotate the beverage can 502 relative to the beverage drinking apparatus 500 about an axis of rotation A1 (e.g., fulcrum) defined by the curved portion 510, for example, about the center of a circle C1 whose radius is R1. In examples, the radius R1 may be in the range of 15-25 mm (e.g., 18-20 mm). The pivot arm 512 curvature may substantially correspond with the circle C1. For example, the pivot arm 512 curvature may be defined by the circle C1. The center of circle C1 may be proximate to the axis of rotation A1.

When the curved portion 510 abuts the bottom surface of the beverage can 502 and the beverage drinking apparatus 500 is rotated relative to the beverage can 502, the entry portion 528 may pierce the sidewall of the beverage can 502, as described herein. For example, in the second position 504, the entry portion 528 may at least partially be within the beverage can 502. The beverage drinking apparatus 500 and the beverage can 502 may be rotated relative to one another until the sidewall of the beverage 502 can makes contact with a front surface of the shroud 542. When the front surface of the shroud abuts the sidewall of the beverage can 502, the entry portion 528 (e.g., a tip of the entry portion 528) may be spaced away from an internal bottom surface of the beverage can 502. For example, the entry portion 528 may be configured such that the tip (e.g., such as tip 120 shown in FIGS. 1-10) does not contact the internal bottom surface of the beverage can 502 when the entry portion 528 is fully inserted into the beverage can 502. When the beverage drinking apparatus 500 is in the second position 504, the entry portion 528 may enable liquid in the can to flow through the entry portion 528 and out of the spout 560.

Although the figures show the pivot arm 512 extending from the shroud 542 and the spout 560 and comprising a curved portion 510, it should be appreciated that the curved portion 510 may be the entire pivot arm 512 such that the curved portion 510 extends from the shroud 542 and/or the spout 560.

Figure 21B:
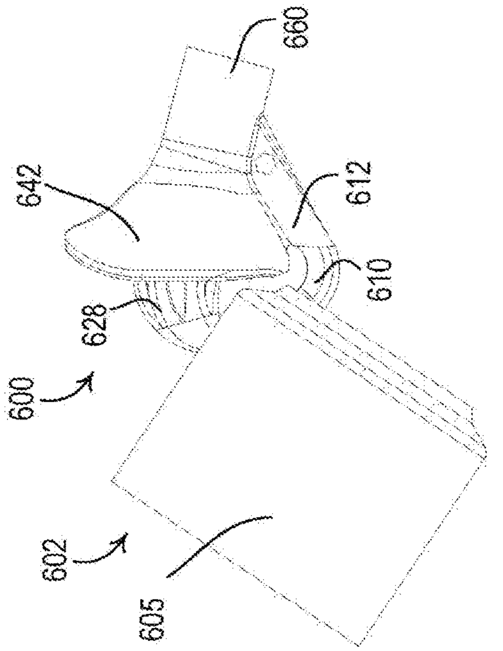
FIGS. 21A, 21B, and 21C are example diagrams of another example beverage drinking apparatus puncturing a beverage can.
Figure 21A:
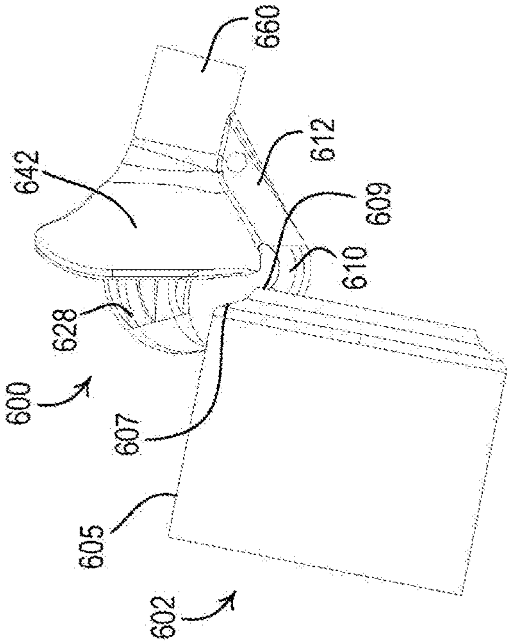
Figure 21C:
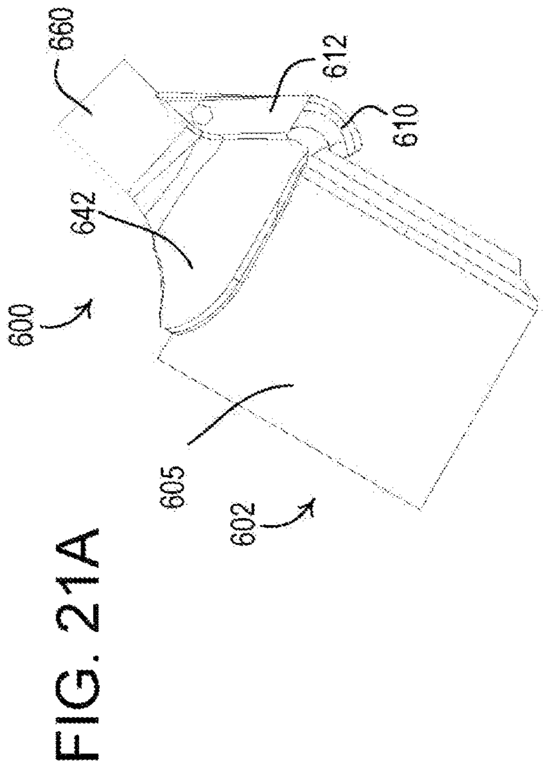

FIGS. 21A, 21B, and 21C are example diagrams of a beverage drinking apparatus 600 (e.g., the beverage drinking apparatus 100 shown in FIGS. 1-10, the beverage drinking apparatus 200 shown in FIG. 11, the beverage drinking apparatus 300 shown in FIGS. 12-15, the beverage drinking apparatus 400 shown in FIGS. 16-19, and/or the beverage drinking apparatus 500 shown in FIG. 20) for dispensing a liquid from a beverage can 602. As shown, the beverage drinking apparatus 600 may be rotated relative to the beverage can 602. A user may place the beverage drinking apparatus 600 in a first position relative to the beverage can 602 (e.g., as shown in FIG. 21A). When the beverage drinking apparatus 600 is in the first position, the curved portion 610 of the pivot arm 612 may abut (e.g., contact) a bottom surface (e.g., a bottom flange 609) of the beverage can 602. A user may then apply a force on the beverage drinking apparatus 600 such that the beverage drinking apparatus 600 further rotates relative to the beverage can 602 from the first position to a second position (e.g., as shown in FIG. 21B). The beverage drinking apparatus 600 relative to the beverage can 602 may rotate about a fulcrum (e.g., axis A1 shown in FIG. 20) defined by the fulcrum of the curved portion 610. The fulcrum may be proximate to the bottom flange 609 of the beverage can 602, for example, when the beverage drinking apparatus 600 is in the first position, the second position, and/or the third position. For example, the beverage drinking apparatus 600 may rotate from the first position to the second position using the bottom flange 609 of the beverage can 602 as a rotation point. The entry portion 628 may be configured to apply a force (e.g., transfer the force that the user applies to the beverage drinking apparatus 600) on the sidewall 605 of the beverage can 602. For example, the entry portion 628 may pierce a hole in the sidewall 605 of the beverage can 602 between the first position and the second position when, for example, in response to the force applied to the beverage drinking apparatus 600.

When the beverage drinking apparatus 600 is in the second position, the entry portion 628 may partially extend through the hole in the sidewall 605 of the beverage can 602. When the beverage drinking apparatus 600 is in the second position, the user may continue rotating (e.g., applying a force on) the beverage drinking apparatus 600 relative to the beverage can 602 about the fulcrum defined by the fulcrum of the curved portion 610. The beverage drinking apparatus 600 and the beverage can 602 may be further rotated relative to one another from the second position to a third position (e.g., as shown in FIG. 21C). When the beverage drinking apparatus 600 is in the third position, the shroud 642 and/or a gasket (e.g., such as gasket 180 shown in FIGS. 9-10, gasket 280 shown in FIG. 11, gasket 380 shown in FIGS. 12-15, and/or gasket 480 shown in FIGS. 16-19) attached to the shroud 642 may abut the sidewall 605 of the beverage can 602 and the entry portion 628 may be fully inserted within the hole in the sidewall 605 of the beverage can 602. When the entry portion 628 is fully inserted into the hole in the sidewall 605 of the beverage can 602, apertures on the entry portion 628 (e.g., such as apertures 126 shown in FIGS. 1-10) may be at least partially within the beverage can 602. The gasket may be configured to wrap around (e.g., conform to) the sidewall 605 of the beverage can 602. The gasket may prevent the liquid from leaking between the shroud 642 and the sidewall 605 of the beverage can 602.

When the beverage drinking apparatus 600 is in the third position, a user may be able to drink the liquid through the spout 660. For example, a user may open the pop tab (not depicted) on the top of the beverage can 602 to permit air flow and may drink (e.g., shotgun) the beverage (e.g., beer) through the spout 660 of the beverage drinking apparatus 600. Friction between the sidewall 605 of the beverage can 602 and the entry portion 628 may retain the beverage drinking apparatus 600 in the third position. Additionally or alternatively, the user may hold the beverage drinking apparatus 600 in the third position. The fulcrum may be proximate to (e.g., abut) the bottom flange 609 of the beverage can 602, for example, when the beverage drinking apparatus 600 is in the first position, the second position, and/or the third position.

Although features and elements are described herein in particular combinations, each feature or element can be used alone or in any combination with the other features and elements.

What is claimed is:

1. A beverage drinking apparatus comprising:
- a spout comprising a bore;
- a pivot arm configured to abut a bottom surface of a beverage can;
- a shroud extending from the spout; and
- an entry portion extending from a first end of the spout, the entry portion comprising:
  - a flow portion configured to allow liquid to flow from the beverage can; and
  - a piercing portion that is configured to pierce a hole in a sidewall of the beverage can as the beverage drinking apparatus is pivoted with the pivot arm engaged with the bottom surface of the beverage can,
- wherein the entry portion is curved downward toward the pivot arm from the shroud to the piercing portion such that the piercing portion and the flow portion penetrate the hole as the beverage drinking apparatus is further pivoted such that liquid from the beverage can is able to flow into the bore through the flow portion, and
- wherein the shroud is configured to be proximate to the sidewall of the beverage can when the entry portion is received within the hole.

2. The beverage drinking apparatus of claim 1, further comprising a gasket that is configured to seal around the hole in the sidewall of the beverage can when the entry portion is received within the hole.

3. The beverage drinking apparatus of claim 1, wherein the spout enables a user to drink the liquid from the beverage can via the spout when at least a portion of the entry portion is received within the hole in the sidewall of the beverage can.

4. The beverage drinking apparatus of claim 1, wherein the pivot arm extends from the shroud.

5. The beverage drinking apparatus of claim 1, wherein the shroud comprises a concave inner face that is configured to be proximate to the sidewall of the beverage can when the entry portion is received within the hole, and wherein a concavity of the concave inner face corresponds to a convexity of the sidewall of the beverage can.

6. The beverage drinking apparatus of claim 5, further comprising a gasket that is configured to provide a seal between the hole and the shroud when the entry portion is received within the hole, wherein the gasket is between the concave inner face and the sidewall of the beverage can when the entry portion is received within the beverage can.

7. The beverage drinking apparatus of claim 6, wherein the gasket comprises a plurality of apertures proximate to a plurality of corresponding flaps.

8. The beverage drinking apparatus of claim 7, wherein the shroud defines a plurality of tabs that are configured to be received within the plurality of apertures for retaining the gasket to the shroud.

9. The beverage drinking apparatus of claim 1, wherein the pivot arm extends from the spout.

10. The beverage drinking apparatus of claim 1, wherein the piercing portion comprises a punch comprising a tip at a distal end that is configured to pierce the sidewall of the beverage can.

11. The beverage drinking apparatus of claim 10, wherein a cross-sectional area of the entry portion decreases from the flow portion to a distal end of the piercing portion.

12. The beverage drinking apparatus of claim 11, wherein the width of the flow portion increases from the piercing portion to an intermediate location that is configured to be aligned with the sidewall when the shroud is proximate to the sidewall of the beverage can, and wherein the cross-sectional area of the entry portion decreases from the intermediate location to a concave inner face of the shroud.

13. The beverage drinking apparatus of claim 1, wherein the entry portion has a polygonal cross-section, a circular cross-section, or an elliptical cross-section.

14. The beverage drinking apparatus of claim 1, wherein a diameter of the flow portion increases from the piercing portion to an intermediate location that is configured to be aligned with the sidewall when the entry portion is fully inserted into the beverage can, wherein the diameter of the flow portion at the intermediate location is configured to allow for relief around the flow portion at the sidewall.

15. The beverage drinking apparatus of claim 1, wherein the pivot arm comprises a curved portion that is configured to engage the bottom surface of the beverage can, and wherein the curved portion defines a fulcrum for rotating the beverage drinking apparatus.

16. The beverage drinking apparatus of claim 1, wherein the flow portion comprises a plurality of apertures.

17. A beverage drinking apparatus for piercing a beverage can to allow liquid to flow out of the beverage can and through the beverage drinking apparatus, the beverage drinking apparatus comprising:

a spout comprising a bore;

a pivot arm configured to abut a bottom surface of a beverage can;

a shroud extending from the spout; and an entry portion extending from a first end of the spout, the entry portion comprising:

a flow portion defining one or more apertures; and a piercing portion comprising a tip that is distal from the shroud, wherein the entry portion is curved downward toward the pivot arm from the shroud to the piercing portion, and wherein the bore extends from the flow portion to the spout.

18. The beverage drinking apparatus of claim 17, wherein the entry portion is configured such that the piercing portion and the flow portion penetrate a hole in the beverage can as the beverage drinking apparatus is pivoted with the pivot arm engaged with the bottom surface of the beverage can such that liquid from the beverage can is able to flow into the bore through the one or more apertures.

19. The beverage drinking apparatus of claim 17, wherein the tip is configured to pierce a hole in a sidewall of the beverage can.

20. The beverage drinking apparatus of claim 18, wherein the shroud is configured to partially surround the sidewall of the beverage can when the entry portion is received within the hole.

21. The beverage drinking apparatus of claim 17, wherein the pivot arm comprises a curved portion that is configured to engage the bottom surface of the beverage can, and wherein the curved portion defines a fulcrum for rotating the beverage drinking apparatus.

* * * * *